United States Patent [19]

Johnson et al.

[11] Patent Number: 5,768,477
[45] Date of Patent: Jun. 16, 1998

[54] RADIO DIRECTION FINDING SYSTEM FOR NARROWBAND MULTIPLE SIGNALS

[75] Inventors: Richard L. Johnson; William J. Montville, both of San Antonio, Tex.

[73] Assignee: Southwest Research Institute, San Antonio, Tex.

[21] Appl. No.: 711,040

[22] Filed: Sep. 10, 1996

[51] Int. Cl.$^6$ .................................................. G06F 15/18
[52] U.S. Cl. ........................... 395/22; 395/11; 395/23
[58] Field of Search ........................................ 395/22, 23

[56] References Cited

U.S. PATENT DOCUMENTS

| | | | |
|---|---|---|---|
| 4,954,963 | 9/1990 | Penz et al. | 395/22 |
| 5,345,539 | 9/1994 | Webb | 395/22 |
| 5,490,062 | 2/1996 | Leach et al. | 364/421 |
| 5,563,982 | 10/1996 | Wang et al. | 395/22 |
| 5,581,658 | 12/1996 | O'hagan et al. | 395/22 |
| 5,613,039 | 3/1997 | Wang et al. | 395/22 |

FOREIGN PATENT DOCUMENTS 6268632  9/1994  Japan ........................ H04J 13/00

OTHER PUBLICATIONS

T. Lo, H. Leung, and J. Litva, "Radial Basis Function Neural Network for Direction-of-Arrivals Estimation," *IEEE Signal Processing Letters*, vol. 1, No. 2, Feb. 1994.

Primary Examiner—George B. Davis
Attorney, Agent, or Firm—Baker & Botts, L.L.P.

[57] ABSTRACT

A method of training a neural network to determine directions of arrival when there are multiple input signals within a narrow frequency band. For a single input signal having a given angle of arrival, an antenna array is used to sample signal values, from which spatial covariance matrix values are obtained. Each value is applied at an input node of the neural network. The neural network is adjusted so that an output node associated with that signal's angle of arrival fires in response to these inputs. This process is repeated for different angles of arrival, such that for L different angles of arrival, L output nodes are trained with L different training sets of data. Once trained, the neural network can be used in a direction finding system that detects whatever number of signals are present in a received wavefield having any number of signals.

18 Claims, 2 Drawing Sheets

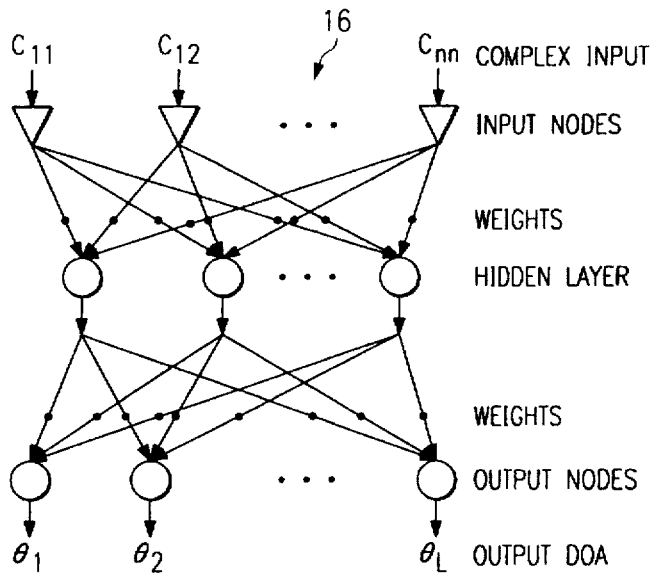

FIG. 3

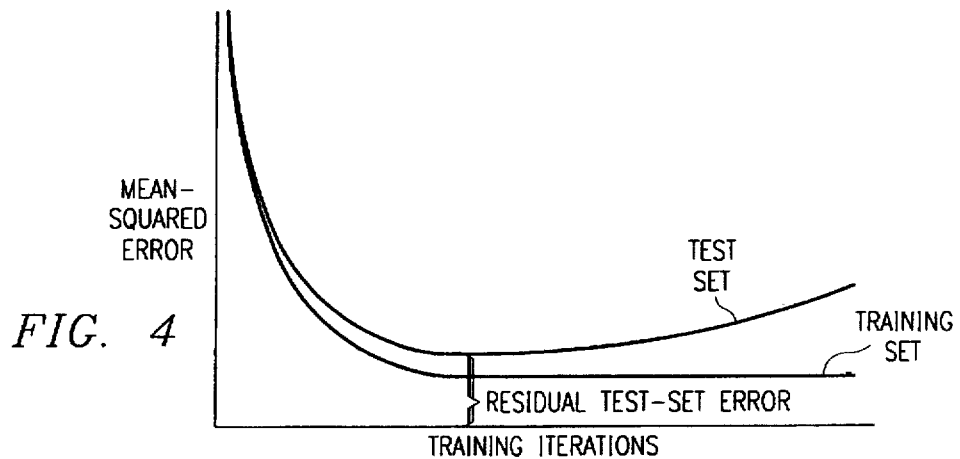

FIG. 4

$$C = \begin{bmatrix} \langle x_1,x_1^* \rangle & \langle x_1,x_2^* \rangle & \langle x_1,x_3^* \rangle & \langle x_1,x_4^* \rangle & \langle x_1,x_5^* \rangle & \langle x_1,x_6^* \rangle \\ \langle x_2,x_1^* \rangle & \langle x_2,x_2^* \rangle & \langle x_2,x_3^* \rangle & \langle x_2,x_4^* \rangle & \langle x_2,x_5^* \rangle & \langle x_2,x_6^* \rangle \\ \langle x_3,x_1^* \rangle & \langle x_3,x_2^* \rangle & \langle x_3,x_3^* \rangle & \langle x_3,x_4^* \rangle & \langle x_3,x_5^* \rangle & \langle x_3,x_6^* \rangle \\ \langle x_4,x_1^* \rangle & \langle x_4,x_2^* \rangle & \langle x_4,x_3^* \rangle & \langle x_4,x_4^* \rangle & \langle x_4,x_5^* \rangle & \langle x_4,x_6^* \rangle \\ \langle x_5,x_1^* \rangle & \langle x_5,x_2^* \rangle & \langle x_5,x_3^* \rangle & \langle x_5,x_4^* \rangle & \langle x_5,x_5^* \rangle & \langle x_5,x_6^* \rangle \\ \langle x_6,x_1^* \rangle & \langle x_6,x_2^* \rangle & \langle x_6,x_3^* \rangle & \langle x_6,x_4^* \rangle & \langle x_6,x_5^* \rangle & \langle x_6,x_6^* \rangle \end{bmatrix}$$

FIG. 5

RADIO DIRECTION FINDING SYSTEM FOR NARROWBAND MULTIPLE SIGNALS

TECHNICAL FIELD OF THE INVENTION

This invention relates to radio direction finding systems, and more particularly to a radio direction finding system that receives multiple signals and simultaneously determines the number of signals and the direction of arrival of each signal.

BACKGROUND OF THE INVENTION

It is often desired to determine the direction from which a radio signal is received. A typical application of a direction finding system is for locating a target transmitter. Two receivers at different locations each determine an angle of arrival for a signal from the target. The two readings are triangulated to locate the target. Another application is in navigation, where a receiver determines its own location from the angle of arrival for each of two signals from two transmitters in known and different locations.

There are many existing techniques for determining direction of arrival. These systems vary with respect to the type of antenna used and the type of processing performed on the antenna signals.

The premise of most radio direction finding systems is that the received wavefield is composed of one signal propagating as a single planewave. This assumption leads to erroneous direction results in the presence of multipath propagation or interference from other signals. When multiple signals are present in the wavefield, the wavefront is generally not planar, and the angle of arrival is dependent on the spatial location of the antenna. To solve this problem, a number of techniques have been developed to decompose complex wavefields into constituent signals and to estimate an angle of arrival for each. These techniques generally have slow response times due to computational complexity.

A method of finding the directions of arrival of multiple signals in a received wavefield is described in Lo, et al. "Radial Basis Function Neural Network for Direction of Arrivals Estimation", *IEEE Signal Processing Letters*, Vol. 1, No. 2, February 1994. Each antenna of an array receives the wavefield. The antenna outputs are sampled and the samples are converted to values of a covariance matrix. The matrix values are input to an artificial neural network, which is trained to determine directions around an azimuth in increments. The training method uses $L^M$ sets of training data, where L is the number of azimuth increments and M is the number of incoming signals. Each neural network output is associated with an azimuth direction, and is trained to "fire" in response to data representing a signal from that direction. To properly infer the correct azimuth directions, one must assume that M signals are present in the received wavefield. This may not always be true.

SUMMARY OF THE INVENTION

One aspect of the invention is a method of training an artificial neural network to determine the azimuth direction of arrival of multiple incoming radio signals. The neural network simultaneously determines the number of signals and the angle of arrival for each.

An array of antennas is used to receive a wavefield comprised of a single signal from a known azimuth direction. The output of each antenna is converted to a digital value representing a complex signal value. These receiving and converting steps are repeated at a number of time intervals, thereby obtaining sample vectors, one vector representing an output from all antennas at one instant in time. From these vectors, a matrix of spatial covariance values is calculated. The neural network has a number of input nodes to which values of the matrix are delivered. The neural network also has a number of output nodes, each associated with a different azimuth direction. During the training phase, the weights of the neural network are adjusted so that an output node of the neural network, associated with a known azimuth direction of the input signal, fires in response to values at the input nodes representing a signal from that direction. To complete the training phase, these steps are repeated for a number of azimuth directions, each azimuth direction associated with a different output node of the neural network.

An advantage of the invention is that it provides a method for training a neural network to decompose a wavefield comprised of superposed signals during the test mode of operation. Training the neural network only requires a single signal varied over different azimuth angles of arrival. In other words, training uses L sets of training data, where L is the number of azimuth increments. Unlike prior methods that use LM sets of training data, M being the number of signals in the wavefield, no a priori knowledge of the number of signals in the wavefield is required during the test mode.

BRIEF DESCRIPTION OF THE DRAWINGS

FIG. 3 illustrates the neural network of FIGS. 1 and 2.

FIG. 4 illustrates the use of training sets and test sets to optimize the training process of the neural network.

FIG. 5 illustrates the partitioning of the spatial covariance matrix for training the neural network to operate when the incoming signals are coherent signals.

DETAILED DESCRIPTION OF THE INVENTION

Figure 1:
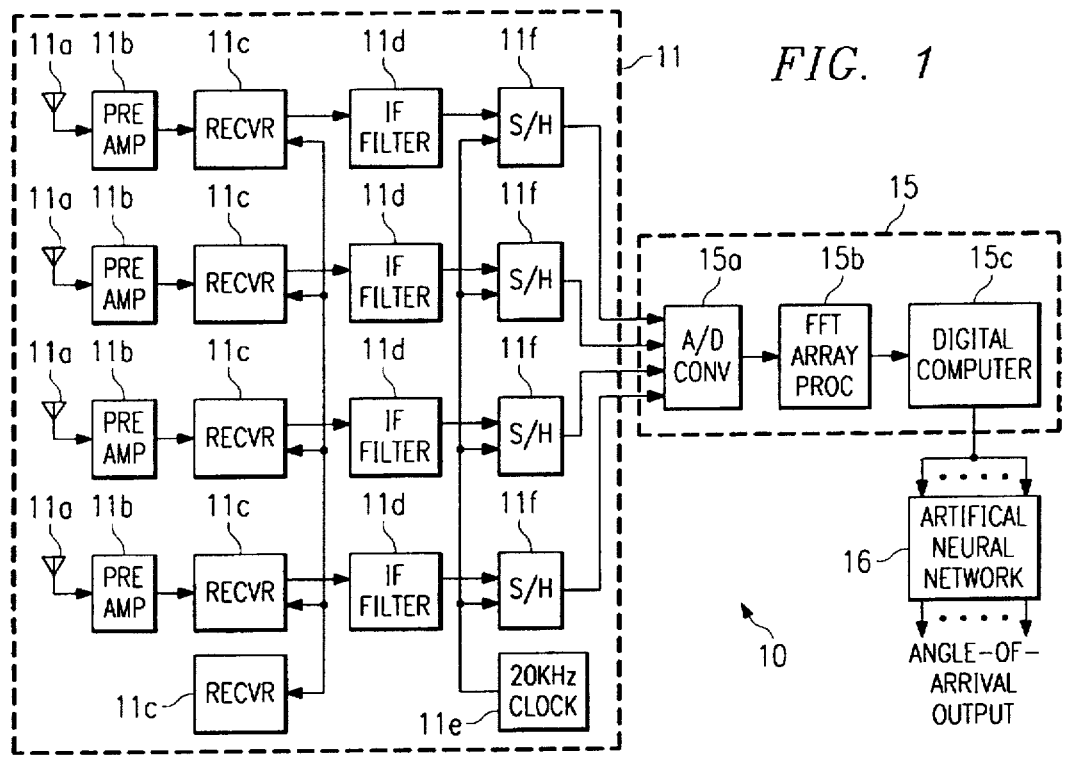
FIG. 1 illustrates a direction finding system in accordance with the invention.
Figure 2:
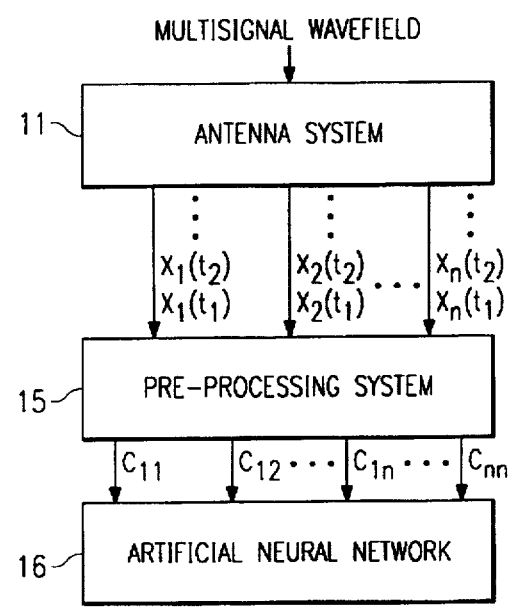
FIG. 2 illustrates the data flow within the direction finding system of FIG. 1.

FIG. 1 illustrates a direction finding system 10, having an antenna system 11, a pre-processing system 15, and an artificial neural network 16, in accordance with the invention. FIG. 2 illustrates the data flow within system 10.

As explained below, the invention is directed to using system 10 to determine angles of arrival of "narrow band" signals arriving from different directions. By "narrow band" signals is meant signals whose modulation bandwidth is small relative to the carrier frequency. Also, the carrier frequencies are sufficiently close such that they cannot be readily distinguished by filtering. A typical example of such signals are those that are within 1 KHz of each other with a total modulation spread of about 1–2 KHz.

When the wavefield is comprised of M signals, and the signals are narrow band, the mth signal may be represented as:

$$S_m = A_m e^{j2\pi(f_0 t - k_m \cdot r) + \theta_m}$$

where $r = (r_x, r_y, r_z)$ represents an arbitrary coordinate in a Cartesian reference system, $A_m$ is signal amplitude, $f_0$ is the frequency of the wave, $k_m = V_m f_0 / |V_m|^2$ is the wavenumber which is a function of the scalar frequency and vector velocity of propagation, $\theta$ is a random phase component and k.r denotes dot product.

Antenna system 11 has a number of individual antennas 11a. It receives the incident radio wavefield and provides a number of outputs, one from each antenna 11a. The antennas 11a may be arranged in a linear, circular, crossed baseline, or arbitrary geometry. The signal received at the nth antenna in the presence of additive noise is:

$$x_n = \sum_{m=1}^{M} A_m e^{j2\pi(f_0 t - k_m \cdot r_k) + \theta_m} + n_n(t)$$

At each antenna 11a, the received signals are simultaneously applied to one of a number of parallel channels each consisting of a preamplifier 11b and receiver 11c. The radio frequency is down-converted to an intermediate frequency and applied to intermediate frequency filters 11d. A clock lie provides timing signals to sample and hold units 11f. An example of a typical intermediate frequency is 455 KHz, and an example of a typical sample frequency is 20 KHz. The result is a digitized signal from each antenna 11a occupying a baseband frequency of 10 KHz.

Referring to FIG. 2, the output of antenna system 11 at each time, $t_1, t_2, \ldots$, is a vector of simultaneous samples, $x_1, x_2, \ldots x_n$. As discussed below, one aspect of the invention is a simplified training process for neural network 16. For training, this data could alternatively be created by simulating antenna system 11 and using mathematical models.

Pre-processing system 15 performs an analog-to-digital conversion by sequencing the A/D converter 15a through the sample and hold outputs. The signals are converted from real to complex form using Fourier analysis through FFT, using FFT array processor 15b. From antenna system 11, each of the N parallel channels results in a time series of k real samples, and the output of FFT processor 15b is k/2 complex values for each channel. In each channel, the complex value from the frequency bin with the greatest absolute magnitude is taken to be the sample value over the block of time containing k-1 intervals. This process is repeated for L time blocks in each channel, resulting in L samples in each channel. Alternatively, the conversion from real to complex values could be accomplished by Hilbert transform using a quadrature digital filter (not shown).

Computer 15c estimates spatial covariance matrix values, using the complex outputs from FFT processor 15b. If there are N antennas, the matrix has N×N values. For L vectors of N samples, $x_1, x_2 \ldots x_n$, acquired in L time blocks, $t_1, t_2 \ldots t_L$, each element of the matrix, $C_{ij}$, i=1,2, ..., n and j=1,2, ..., n, is calculated as an average over time:

$$C_{ij} = 1/L \sum_{l=1}^{L} x_i(t_l) x_j^*(t_l)$$

, where $x_j^*(t_l)$ is the complex conjugate of $x_j(t_l)$

A characteristic of the covariance matrix is that it is Hermitian about the main diagonal, such that $C_{ij}=C_{ji}^*$. A further symmetry exists if antennas 11a form a linear array and are equally spaced. The matrix is then a Toeplitz array, characterized by any one row or any one column. As explained below, this feature can be used to reduce the number of input values to be applied to neural network 16 to N instead of N×N.

FIG. 3 illustrates neural network 16 in further detail. Neural network has an input layer, an output layer, and one hidden layer. It is of a type known as a back-propagation network. The spatial covariance matrix values are applied to the input nodes. For complex values, one input node can be used for the real part and one for the imaginary part. Each output node is associated with an angle of arrival. For example, there might be 19 output nodes, each representing a 10° increment, from 0° to 180° inclusive. After neural network 16 has been trained, its function is to decompose a received wavefield comprised of any number of signals by estimating the number of signals as well as their direction of arrival. This estimation process is known as the "test model" of the network operation.

Neural network 16 is trained with a training signal at a specified frequency, varied over different angles of arrival. Typically, this is accomplished for a given frequency, by varying the angle of arrival across a range of azimuth values in equal increments. For example, the training signal might vary in 10° increments from 0° to 180° to correspond to a neural network 16 having 19 output nodes. Superresolution capability may be provided by training neural network 16 in angular increments of less than one beamwidth of the array of antennas 11a.

A "training set" of inputs to neural network 16 comprises a covariance matrix of values representing the training signal from a given angle of arrival. For each training set, weights within the neural network 16 are adjusted so that the output node associated with the correct azimuth will fire. For the various angles of arrival, the training sets are applied in random order, as opposed to stepping through the azimuth sequentially.

The training may be accomplished with a back propagation algorithm. To improve accuracy of results, more than one training set may be used for each angle of arrival.

A feature of the invention is the recognition that there is no need to train neural network 16 with more than one signal. Thus, neural network 16 need only be trained with L sets of inputs where L is the number of azimuth increments. After training, when the direction finding system 10 is operated in the actual test mode, it estimates the number of signals in the received wavefield as well as each signal's angle of arrival. The single training signal results in a system 10 that can detect any number of signals because it is not limited to detecting same number of signals as the number of signals used for training (or perhaps multiples thereof) as are previous systems. Essentially, for system 10, every number (of signals in the received wavefield) is a multiple of one (the number of training signals). The received pattern is always a superposition of the signal the system 10 was trained on.

FIG. 4 illustrates a training technique used to optimize the development of the weights of neural network 16. Each training set is divided into two subsets: the first and larger subset (the training set) is used to determine the weighting parameters and the smaller subset (the test set) is used as an "unknown" input to measure the convergence of the training process. After several iterations of training sets, one of the test sets is applied to evaluate the squared error at the output. The process alternates between training and testing until a minimum is reached in the squared error of the output. The weights associated with the minimum squared error should be used for normal testing with operational data.

Once neural network 16 is trained, direction finding system 10 may be used to receive a complex wavefield comprised of two or more signals. The wavefield is sampled and the spatial covariance matrix is estimated as described above. Neural network 16 fires simultaneously on each output node that is associated with a direction of arrival of an incoming signal. The strength of the firing of each output node is used to estimate the number of signals in the received wavefield. For example, if three nodes fire, it can be concluded that there were three superposed input signals. Thus, neural network 16 provides an estimation of the number of signals in the wavefield and the direction of arrival of each. This wavefield decomposition process is performed in real time as wavefield samples are acquired, and this process is the normal testing mode of operation.

As stated above, an alternative training method can be used if antennas 11a are in a linear array. In this case, the inputs to neural network 16 can be N values of a row or column of the covariance matrix, rather than N×N values of the entire matrix.

Another alternative training method may be used when the incoming signals are to have substantially the same phase as the signal used for training neural network 16. The inputs of neural network 16 may then be N amplitude/phase values. An amplitude or phase value is applied to each input node. In this case, signal amplitudes are used directly without computing a covariance matrix.

FIG. 5 illustrates a variation of the method of the invention, which may be used when the arriving signals are coherent. It uses an alternative method for obtaining the spatial covariance values, based on "spatial smoothing". In essence, the antenna array 11 is moved relative to a fixed interference field. For the method illustrated in FIG. 5, antenna array 11 has been divided into three subsets. For a linear array 11 having 6 antennas and non-overlapping subsets, each subset has 2 antennas 11a. The covariance matrix for the entire antenna array 11 is obtained as described above. It is then divided into submatrices corresponding to each subset of antenna array 11. The submatrices along the main diagonal, identified as submatrices 51, 52, and 53, are averaged to obtain the $C_{ij}$ inputs to neural network 16.

The training process can also be modified to include altitude as well as direction of arrival. In this case, neural network 16 would have an output node for each different altitude/azimuth combination. For example, for an azimuth range of 180° and an altitude range of 90°, both in 10° increments, neural network 16 would have 19×10 or 190 output nodes. Likewise, each training set would represent a different altitude/azimuth combination.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of using a single training signal to train a neural network to determine the number of signals in a received wavefield, and the azimuth angle of arrival of each, comprising the steps of:
   receiving, with an array of antennas, a training signal from a known azimuth direction;
   converting the output of each said antenna to a digital value representing a complex signal value;
   repeating said receiving and converting steps at a number of time intervals, thereby obtaining sample vectors, one said vector at each time interval;
   calculating, from said vectors, a matrix of spatial covariance values, said values comprising a training set;
   applying each value of said training set to an input node of said neural network, said neural network having an number of output nodes, each associated with a different azimuthal direction;
   adjusting said neural network so that an output node of said neural network associated with said known azimuth direction of said signal fires in response to said applying step; and
   repeating all of the above steps with said training signal from a number of known azimuth directions, each of said known azimuth directions associated with a different output of said neural network.

2. The method of claim 1, wherein said number of azimuthal directions are even increments of a range of azimuth directions.

3. The method of claim 1, wherein said increments are less than the beamwidth of said antenna array.

4. The method of claim 1, wherein said neural network has additional output nodes, each associated with a different altitude, and further comprising the step of repeating the method with said training signal at a number of different altitudes such that a different output node of said neural network fires in response to said training signal at each said different altitude.

5. A method of using a single training signal to train a neural network to determine the number of signals in a received wavefield in a received wavefield and the azimuth angle of arrival of each, comprising the steps of:
   receiving, with a linear array of antennas, having substantially equal spacing, a training signal from a known azimuth direction;
   converting the output of each said antenna to a digital value representing a complex signal value;
   repeating said receiving and converting steps at a number of time intervals, thereby obtaining sample vectors, one said vector at each time interval;
   calculating, from said vectors, a row or column of a matrix of spatial covariance values;
   applying each value of said row or column to an input node of said neural network, said neural network having an number of output nodes, each associated with a different azimuth direction;
   adjusting said neural network so that an output node of said neural network associated with said known azimuth direction of said signal fires in response to said applying step; and
   repeating all of the above steps with said training signal for a number of known azimuth directions, each said known azimuth direction associated with an output of said neural network.

6. The method of claim 5, wherein said number of azimuth directions are even increments of a range of azimuth directions.

7. The method of claim 5, wherein said increments are less than the beamwidth of said antenna array.

8. The method of claim 5, wherein said neural network has additional output nodes, each associated with a different altitude, and further comprising the step of repeating the method with said training signal at a number of different altitudes such that a different output node of said neural network fires in response to said training signal at each said different altitude.

9. A method of using a single training signal to train a neural network to the number of signals in a received wavefield, and the azimuth angle of arrival of each, said signals having an expected phase, comprising the steps of:
   receiving, with an array of antennas, a training signal from a known azimuth direction having substantially the same phase as said expected phase;
   converting the output of each said antenna to a digital value;

repeating said receiving and converting steps at a number of time intervals, thereby obtaining sample vectors, one said sample vector at each time interval;

calculating, from said sample vectors, average amplitude and phase values;

applying each said average amplitude and phase value to an input node of said neural network, said neural network having an number of output nodes, each associated with a different azimuthal direction;

adjusting said neural network so that an output node of said neural network associated with said known azimuth direction of said signal fires in response to said applying step; and repeating all of the above steps with said training signal for a number of known azimuth directions, each said known azimuth direction associated with an output of said neural network.

10. The method of claim 9, wherein said number of azimuth directions are even increments of a range of azimuth directions.

11. The method of claim 9, wherein said increments are less than the beamwidth of said antenna array.

12. The method of claim 9, wherein said neural network has additional output nodes, each associated with a different altitude, and further comprising the step of repeating the method with said training signal at a number of different altitudes such that a different output node of said neural network fires in response to said training signal at each said different altitude.

13. A method of using a single training signal to train a neural network to determine the number of signals in a received wavefield, and the azimuth angle of arrival of each, said signals being substantially coherent, comprising the steps of:

receiving, with an array of antennas, a training signal from a known azimuth direction;

converting the output of each said antenna to a digital value representing a complex signal value;

repeating said receiving and converting steps at a number of time intervals, thereby obtaining sample vectors, one said vector at each time interval;

calculating, from said vectors, a matrix of spatial covariance values, said values comprising a training set;

dividing said matrix into submatrices and averaging corresponding values of each of said submatrices, thereby obtaining a smoothed training set;

applying each value of said smoothed training set to an input node of said neural network, said neural network having an number of output nodes, each associated with a different azimuthal direction;

adjusting said neural network so that an output node of said neural network associated with said known azimuth direction of said signal fires in response to said applying step; and repeating all of the above steps with said training signals from a number of known azimuth directions, each of said known azimuth directions associated with a different output of said neural network.

14. The method of claim 13, wherein said number of azimuth directions are even increments of a range of azimuth directions.

15. The method of claim 13, wherein said increments are less than the beamwidth of said antenna array.

16. The method of claim 13, wherein said neural network has additional output nodes, each associated with a different altitude, and further comprising the step of repeating the method with said training signal at a number of different altitudes such that a different output node of said neural network fires in response to said training signal at each said different altitude.

17. A method of using a neural network to determine the number of signals in a received wavefield, comprising the steps of:

receiving said wavefield with an array of antennas;

converting the output of each said antenna to a digital value;

applying each said digital value to an input node of said neural network, said neural network having an number of output nodes, each associated with a different azimuthal direction, and said neural network having been trained with a single training signal varied over time from different directions of arrival; and estimating the number of signals in said wavefield by detecting how many of said output nodes of said neural network respond to said applying step.

18. The method of claim 17, further comprising the step of determining the azimuth angle of arrival of each of said signals by detecting which of said output nodes respond to said applying step.

* * * * *